Nov. 26, 1968    V. M. FARQUHAR    3,413,024
MECHANICAL COUPLING

Filed July 13, 1965    3 Sheets-Sheet 1

*INVENTOR.*
VERNON M. FARQUHAR
BY
Morse, Altman & Oates
ATTORNEYS

Nov. 26, 1968  V. M. FARQUHAR  3,413,024
MECHANICAL COUPLING

Filed July 13, 1965  3 Sheets-Sheet 3

INVENTOR.
VERNON M. FARQUHAR
BY
Morse, Altman & Oates
ATTORNEYS

United States Patent Office 3,413,024
Patented Nov. 26, 1968

3,413,024
MECHANICAL COUPLING
Vernon M. Farquhar, 90 Lawton Ave.,
Lynn, Mass. 01902
Filed July 13, 1965, Ser. No. 471,537
1 Claim. (Cl. 287—126)

ABSTRACT OF THE DISCLOSURE

A snap-action coupling comprises a tube with an open end entered by a cylinder of smaller diameter. An annular washer having a square cross-section fits between the tube and cylinder and is rolled by the cylinder when advancing into the tube.

---

This invention relates to a coupling structure for joining to the end of a pipe or tube a member which is inserted in the end of the pipe, a rubber washer being employed between the outside wall of the inserted member and the inside wall of the pipe. An object of the invention is to provide a coupling structure such that considerable force will be required to push the insert member into the pipe end for an initial distance at which point the washer causes the insert member to move an additional distance inward with a sort of snap-action, considerable force then being required to pull the insert member out of the pipe. As examples of how such couplings can be used, mention is made of joining successive lengths of pipe or tubes together without the use of any tools, mounting handles on automobile doors, and inserting electric light bulbs of any size in corresponding sockets.

Representative embodiments of the invention are illustrated on the drawings, of which:

Figure 4:
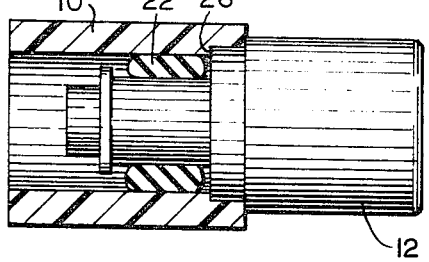
Figure 5:
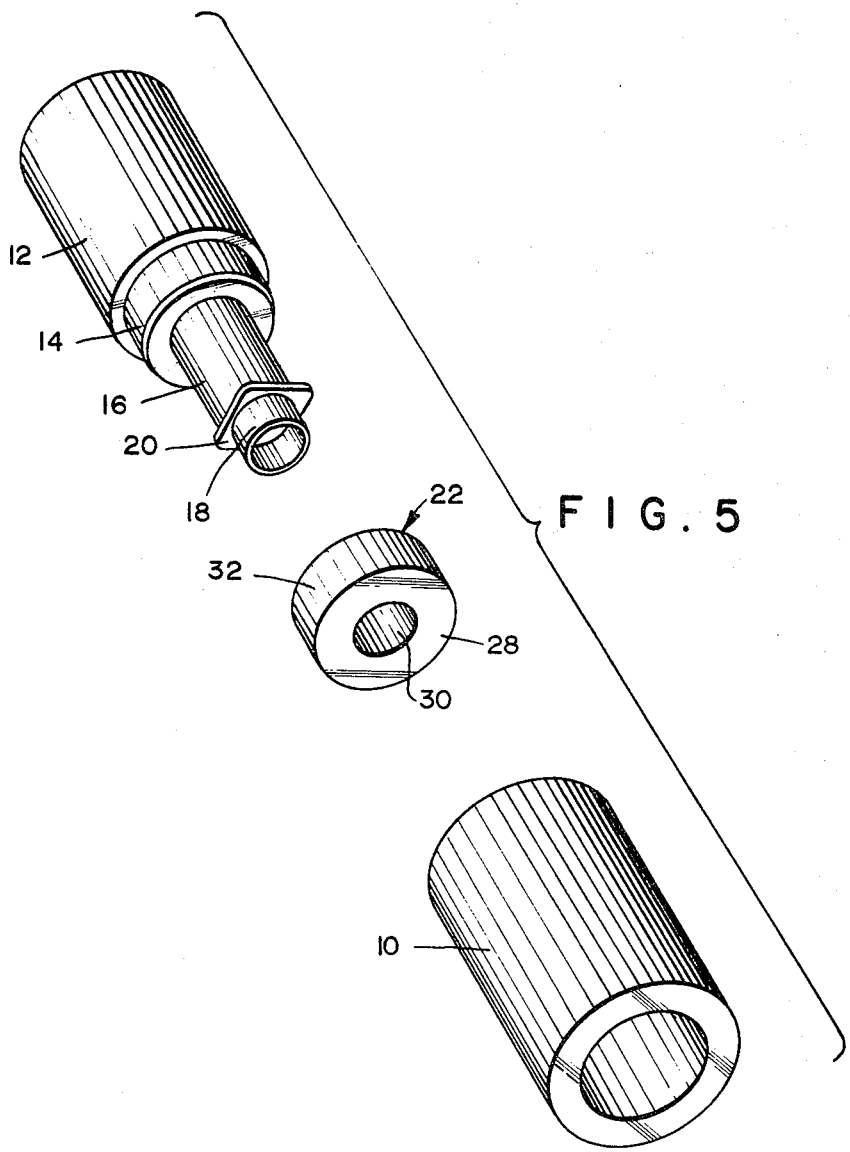
FIGURE 5 is an exploded perspective view of the coupling illustrated in FIGURE 1.
Figure 6:
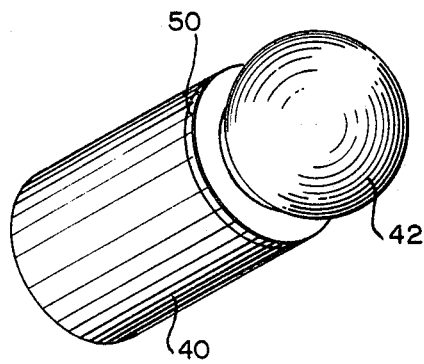
FIGURE 6 is a perspective view of a lamp and socket member assembly.
Figure 7:
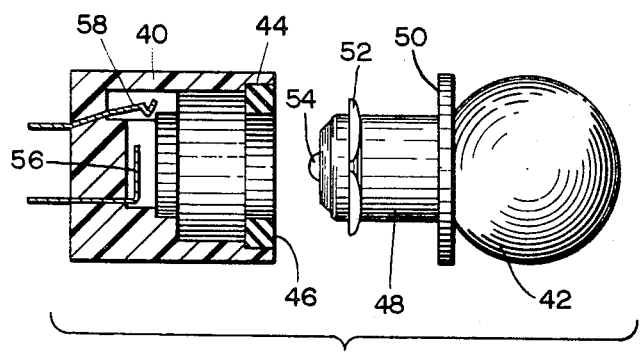
FIGURE 7 is an exploded view of the lamp and socket assembly, the socket being shown in section.
Figure 8:
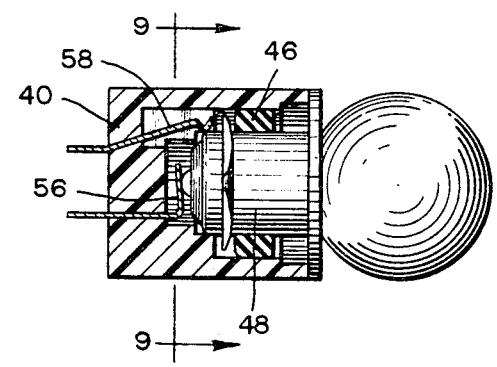
FIGURE 8 shows the lamp and socket assembled.
Figure 9:
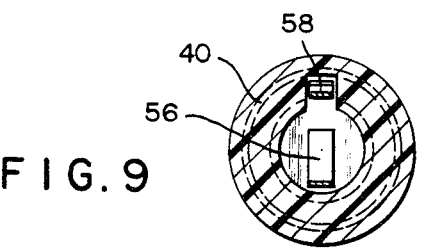
FIGURE 9 is a section on the line 9—9 of FIGURE 8.

The coupling shown in FIGURES 1 to 5 comprises a pipe or tube 10 of indeterminate length, a short piece being shown for convenience. The other principal member of the coupling is shown as a handle 12 having a short extension 14 of slightly reduced diameter and a coaxial stem 16 of substantial length terminating in a short end portion 18 of smaller diameter with a narrow flange 20 between the main portion 16 of the stem and its end portion 18. Segments of the flange 20 are preferably trimmed from its periphery to form an approximately square shape as indicated in FIGURE 5, the maximum diameter of the flange being greater than that of the stem 16 but less than the interior diameter of the member 10. The member 12 can be either solid or tubular. If the latter it can be the end portion of a pipe or tube.

Figure 1:
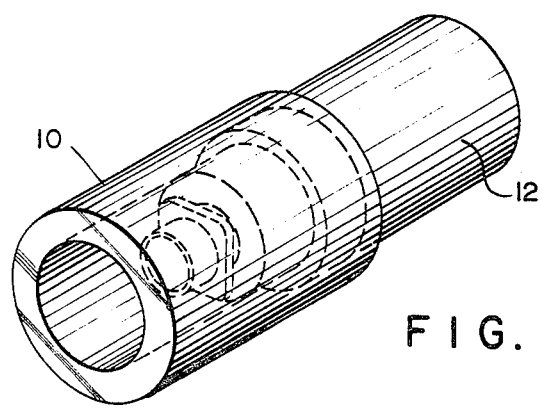
FIGURE 1 is a perspective view of two members assembled together to form a coupling.
Figure 2:
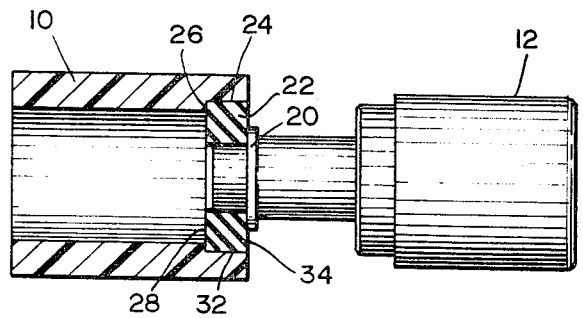
FIGURES 2, 3 and 4 show three stages of movement of one of the members into assembled relation with the other member, one of the members being shown in section.
Figure 3:
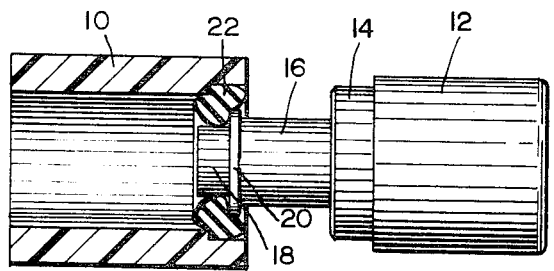

An important element of the coupling is an elastic washer 22 of soft rubber or the equivalent. As shown, the washer 22 is a ring having outer and inner cylindrical faces and at least one planar face. As shown in FIGURE 2, the washer 22 has an approximately square cross-section which fits snugly into a recess 24 within the end of the member 10 made by slightly enlarging the bore of the member 10 for a distance from its orifice equal to the axial length of the washer 22, this recess forming an inner shoulder 26 within the member 10 which faces toward the orifice. The inner diameter of the washer 22 is made equal to the diameter of the extension 18 of the stem 16. The maximum diameter of the flange 20 is somewhat less than the inner diameter of the member 10.

When undistorted as shown in FIGURE 5, the washer 22 has a forward end surface 28, an inner surface 30, an outer surface 32 and a rear end surface 34 (FIGURE 2). To couple the parts together, they are first assembled as shown in FIGURE 2, the marginal portion of the forward surface 28 of the washer 22 bearing against the shoulder 26, and the flange 20 bearing against the rear surface 34 of the washer. Considerable force must be applied to push the members 10 and 12 toward each other. As the stem 16 moves forward into the member 10, the washer is rolled by its engagement with the shoulder 26 and the flange 20 so that the forward surface bulges outward into progressive contact with the inner surface of the member 10 and the inner surface 30 becomes the forward end surface of the washer and it too begins to come into contact with the inner surface of the member 10. Meanwhile, the washer is rolling over the flange 20, the trimmed portions of the flange providing room for the washer to squeeze past but resulting in considerable distortion of the washer. When the washer reaches the point where it is clear of the shoulder 26 it causes a sudden snap action, drawing the member 12 into firm contact with the member 10 as illustrated in FIGURE 4. This snap-action is caused by the effort of the washer to relieve some of the distortion thereof resulting from its being rolled over the flange 20. When the washer is in the position shown in FIGURE 4, it is virtually inside-out, the portion in direct contact with the inner surface of the member 10 being part of the normally forward surface 28 and all of the normally inner surface 30. At the forward end of the washer as it appears in FIGURE 4 is part of the normally rear surface 34, as the washer in this condition is still distorted, it holds the members 10 and 12 firmly but yieldingly in mutual engagement so that they can be pulled apart if sufficient force is applied.

To operate effectively, the dimensions of the parts must be properly proportioned. By way of example, but not limitation, parts having the following dimensions can be employed:

| | Mm. |
|---|---|
| Inner diameter of member 10 | 25 |
| Inner diameter of recess 24 | 28 |
| Axial length of recess 24 | 8.5 |
| Outer diameter of washer 22 | 28 |
| Inner diameter of washer 22 | 12 |
| Diameter of extension 14 | 27.5 |
| Diameter of stem 16 | 16 |
| Diameter of end of stem 18 | 12 |
| Max. diameter of flange 20 | 18 |
| Min. diameter of flange 20 | 16 |
| Length of stem 16 to flange 20 | 18 |

One of the uses to which the invention can be advantageously put is illustrated in FIGURES 6 to 9. As shown, a socket 40 for the lamp 42 of an automobile headlight can be made with a recess 44 in its open end similar to the recess 24. A rubber washer 46 is fitted into this recess. The lamp 42 is made with a cylindrical base 48 of suitable length having a flange 50 at the bulb end wide enough to seat against the end of the socket 40 when the parts come together. A trimmed flange 52 is on the base 48 between the flange 50 and the other end of the base to roll the washer 46 when the base is pushed into the socket. When the washer has been rolled to its inside-out position shown in FIGURE 8, it will be pressing the lamp inward so that the contact terminal 54 of the lamp will be firmly pressed against a socket spring terminal 56 and the metal shell of the base 48 will be pressed into contact with a second socket spring terminal 58. The lamp is thus firmly and resiliently held in place in the socket with no danger of working loose by vibration of the vehicle, but it can easily be removed for replacement by a moderately strong pull thereon. It is mounted in the socket simply by being pushed into the socket. In like manner other objects, such as automobile door handles, can readily be installed or removed but will not work loose when in place.

I claim:

1. A coupling comprising two members and a washer of soft rubber-like material, the first said member having a bore extending thereinto, said bore having an orifice and a terminal recess extending in from said orifice and forming an annular shoulder facing toward the orifice, said washer having cylindrical outer and inner surfaces and at least one planar face when unstressed, the outer surface fitting within said recess, a marginal portion of an end face of the washer engaging said shoulder, the second said member having a surface portion adapted to engage an opposing surface portion of the first said member when the members are coupled, said second member having a stem projecting therefrom having a first portion and a second free end portion, a radial flange on said stem near to but spaced from the free end portion of said stem, said flange having segments trimmed therefrom, the maximum diameter of said flange being greater than the diameter of the first portion of the stem but less than the diameter of the bore, the diameter of the second free end portion of said stem being equal to the inner diameter of said washer and approximately equal to three-fourths of the diameter of the first portion of the stem, said first portion of said stem being of sufficient length to receive the entire washer in its compressed inside-out configuration.

References Cited

UNITED STATES PATENTS 2,674,472  4/1954  Meyer  285—344 X

SAMUEL ROTHBERG, *Primary Examiner.*